(12) United States Patent
Smith et al.

(10) Patent No.: US 8,037,180 B2
(45) Date of Patent: Oct. 11, 2011

(54) CENTRALIZED CONTROL PLANE APPLIANCE FOR VIRTUAL INFRASTRUCTURE

(75) Inventors: Michael R. Smith, San Jose, CA (US); Saravanakumar Rajendran, San Jose, CA (US); Paul Anthony Fazzone, San Jose, CA (US); Shriram Velaga, Los Altos, CA (US); Paul Harry Gleichauf, Cupertino, CA (US); Mark A. Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 12/199,249

(22) Filed: Aug. 27, 2008

(65) Prior Publication Data

US 2010/0057908 A1 Mar. 4, 2010

(51) Int. Cl.
*G06F 15/173* (2006.01)
(52) U.S. Cl. .................. 709/225; 709/223; 703/13
(58) Field of Classification Search .............. 709/225, 709/223; 703/13
See application file for complete search history.

(56) References Cited

U.S. PATENT DOCUMENTS

| 2006/0074618 | A1* | 4/2006 | Miller et al. ............ 703/13 |
| 2007/0067432 | A1 | 3/2007 | Tarui et al. |
| 2007/0260723 | A1* | 11/2007 | Cohen et al. ............ 709/223 |
| 2008/0155223 | A1* | 6/2008 | Hiltgen et al. ........... 711/173 |

FOREIGN PATENT DOCUMENTS

| CA | 2 732 885 | 3/2010 |
| EP | 2318923 | 3/2010 |
| WO | WO 2010/027614 A1 | 3/2010 |

OTHER PUBLICATIONS

Notification of Transmittal of the International Search Report and the Written Opinion of the International Searching Authority, or the Declaration (1 page), International Search Report (3 pages), and Written Opinion of the International Searching Authority (5 pages) for International Application No. PCT/US2009/053517 mailed Nov. 30, 2009.
PCT International Preliminary Report on Patentablity and Written Opinion of the International Searching Authority for PCT/US2009/053517 mailed Mar. 1, 2011; 6 pages.
EPO Apr. 14, 2011 Communication mailed for EP Application Serial No. 09791410.5; 2 pages.
May 24, 2011 Response to Apr. 14, 2011 EPO Communication for EP Application Serial No. 09791410.5; 9 pages.

* cited by examiner

*Primary Examiner* — Kyung H Shin
(74) *Attorney, Agent, or Firm* — Patent Capital Group

(57) ABSTRACT

In a virtual infrastructure, a single appliance is provided that hosts a centralized virtual machine monitor (VMM) control plane to effectively establish a single virtual switch across all virtual machines within one or more clusters of servers, thereby reducing the number of management points for the network administrator and facilitating easier VM migration.

19 Claims, 2 Drawing Sheets

US 8,037,180 B2

CENTRALIZED CONTROL PLANE APPLIANCE FOR VIRTUAL INFRASTRUCTURE

FIELD OF THE INVENTION

The present application relates generally to centralized control planes for virtual infrastructures.

BACKGROUND OF THE INVENTION

Virtualization essentially transforms hardware into software by creating multiple virtual machines on one physical computer. The virtual machines thus share hardware resources without interfering with each other, enabling multiple operating systems and applications to execute at the same time on a single computer, for example, by using a virtual machine hypervisor to allocate hardware resources dynamically and transparently so that multiple operating systems can run concurrently on a single physical computer. In essence, a virtual machine is thus a tightly isolated software container that can run its own operating systems and applications as if it were a physical computer. A virtual machine behaves like a physical computer and contains its own virtual (i.e., software-based) CPU, RAM hard disk and network interface card (NIC). In this way, utilization of costly hardware resources is maximized.

Because multiple virtual machines (VM) may reside on a single computer, management points multiply, complicating VM management particularly with respect to network access control.

BRIEF DESCRIPTION OF THE DRAWINGS

The details of the present invention, both as to its structure and operation, can best be understood in reference to the accompanying drawings, in which like reference numerals refer to like parts, and in which.

DESCRIPTION OF EXAMPLE EMBODIMENTS

Overview

In a virtual infrastructure established on plural physical computing apparatus, a virtual machine monitor (VMM) centralized control plane (CCP) is provided. The VMM CCP establishes, with plural VMM data planes, a single virtual switch across all virtual machines within one or more clusters of servers. At least two of the VMM data planes are associated with respective plural virtual machines (VM).

In one example embodiment the VMM CCP is hosted by one and only appliance and is the only control plane for a cluster of servers. In another example embodiment the VMM CCP is hosted by one and only VM and is the only control plane for a cluster of servers. In still another example embodiment the VMM CCP is hosted by one and only physical Ethernet switch and is the only control plane for a cluster of servers, although in some implementations two controllers active in an active-standby configuration may be used within this scope.

In some implementations a server can host two or more VMs and a single VMM data plane communicates with the VMs of a server. The data plane also communicates with the VMM CCP. Multiple servers can establish a cluster, with the VMM CCP being the only control plane for the cluster.

In another embodiment a method includes providing a cluster of computer servers, and instantiating, on at least a first server in the cluster, at least first and second virtual machines (VM). The method further includes instantiating a first data plane communicating with the first and second VM, instantiating, on at least a second server in the cluster, at least third and fourth virtual machines (VM), and instantiating a second data plane communicating with the third and fourth VM. One and only one control plane communicates with the first and second data planes.

In another embodiment an appliance has a housing, a processor in the housing, and a tangible non-transitory computer readable medium in the housing and accessible to the processor. The medium stores a single virtual machine monitor (VMM) centralized control plane (CCP) configured to communicate with plural VMM data planes in a cluster of servers.

Example Embodiments

Figure 1:
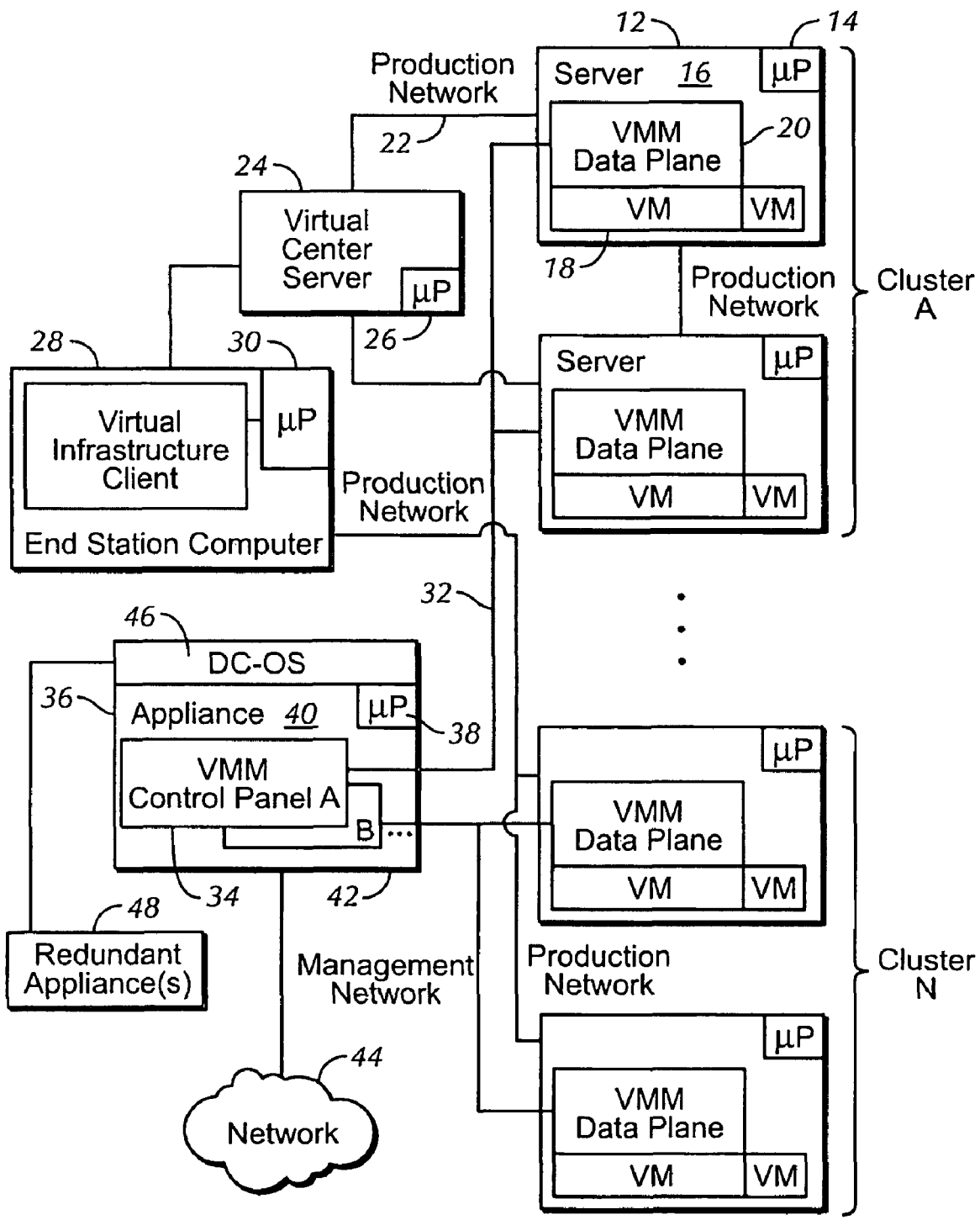
FIG. 1 is a block diagram of an example system in accordance with present principles.

Referring initially to FIG. 1, multiple clusters (only two clusters "A" and "N" shown for ease of disclosure) of computers are shown, with each cluster including two or more computers 12. The computers 12 may be servers, blade servers, or other computers requiring network switching in a virtual infrastructure (VI) environment and running hypervisor software.

As shown in FIG. 1, each computer 12 includes one or more processors 14 accessing a tangible computer-readable storage medium 16 such as, without limitation, disk-based storage, solid state storage, etc. Owing to virtualization, a computer 12 may have only a single processor 14 but can have multiple virtual machines (VM) 18, essentially, software instantiations of physical computers, each with its own operating system, software applications, etc. and each believing it has its own respective processor and data storage. In reality, the VMs 18 share the physical processor 14 and medium 16 of the computer on which they are instantiated, with their operation coordinated by a virtual machine monitor (VMM) 20. As shown in FIG. 1, per present principles a VMM 20 as instantiated on a computer in a cluster executes a respective VMM data plane, with VMM control plane functions being executed remotely as described further below.

As also shown in FIG. 1, the computers 12 of a cluster may communicate with other and with computers of other clusters over a production network 22. In some implementations a virtualization software management server 24 with its own processor 26 may also communicate on the production network in accordance with VI principles. The virtualization software management server 24 can communicate with one or more VI client computers 28, e.g., desktop computers, each with its own processor 30, and/or the VI client computers 28 can communicate directly with the production network 22 as shown.

In accordance with present principles, all of the VMM data planes 20 of a single cluster communicate over a management network 32 with a single VMM centralized control plane (CCP) 34. In one implementation, a single VMM CCP 34 is established per cluster, as shown in FIG. 1, essentially by establishing the VMM CCP on a respective VM. In other implementations, a single VMM CCP 34 may service the VMM data planes of multiple clusters.

The VMM CCP 34 may be hosted on one of the VM 18 in the cluster or may be hosted on a host device 36 with one or more host processors 38 accessing one or more tangible non-transitory computer-readable media 40 bearing the VMM CCP 34. The host device 36 may be a physical Ethernet switch or a standalone appliance with appliance housing 42. The VMM CCP 34 communicates with a network 44 such as, e.g., the Internet. In one non-limiting embodiment the appliance 36 executes an instance 46 of a data center operating system (DC-OS) program that spawns the VMM CCP, manages the local appliance, and manages the local communication interfaces which are not visible to the CCP instances. The DC-OS also manages communication with redundant appliances 48 that can contain standby CCP instances, as well as communication with external management applications such as, e.g., VMWare's VirtualCenter.

In essence, the VMM data planes 20 emulate the software and forwarding hardware on a linecard of a modular Ethernet switch chassis, while the CCP emulates the supervisor of a modular Ethernet switch chassis. Accordingly, in the VMM data planes 20, packets in an incoming format may be forwarded and if desired transformed to an outgoing format for the underlying VMs 18, so that two different types of networks may communicate with each other. Management of packet forwarding to appropriate output ports may also be undertaken in the data planes 20. In the VMM CCP 34, on the other hand, signaling and other control protocols may be executed, as well as per-packet processing operations such as IP forwarding and classification at line rates, although some per-packet processing operations are not handled in the datapath. The VMM CCP may also execute higher layer functions such as establishing routing tables, entering quality service policies; exception handling, and monitoring functions.

Figure 2:
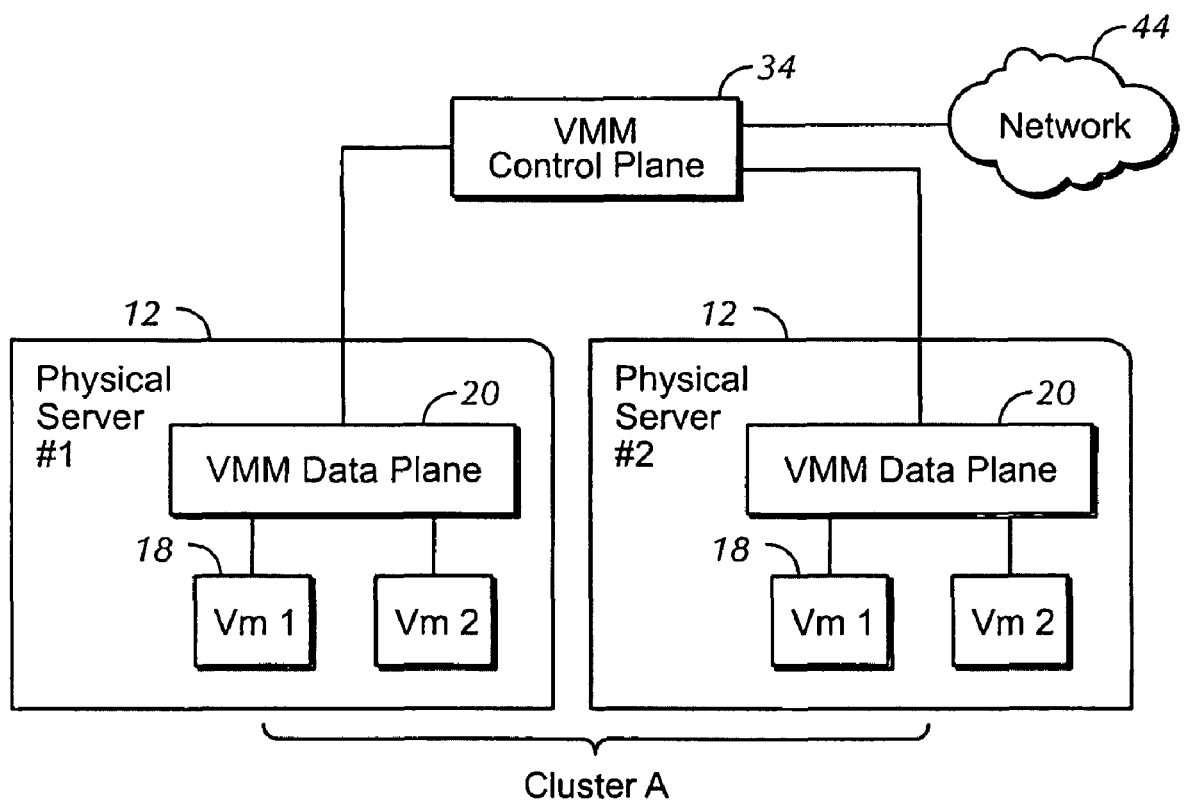
FIG. 2 is a block diagram showing an example architecture with a centralized control plane (CCP).

FIG. 2 illustrates further details of the above disclosure using a single cluster with only two computers 12 for ease of description, it being understood that present principles apply to plural clusters as stated above with two or more computers per clusters. Each computer 12 hosts two or more instantiations of virtual machines 18, with the VM 18 of a computer 12 communicating with a single VMM data plane 20 associated with the computer 12. All of the data planes 20 in a cluster communicate with a single VMM CCP 34 as described above, which can also communication with a network 44. Thus, a single virtual switch is established across all virtual machines 18 within one (and in some instances more than one) cluster of computers by the individual computer data planes 20 working in concert with the single VMM CCP 34.

If desired, if a CCP is running on a switch that is detected to be failing using switch failure detection principles known in the art, the CCP can be moved to another processing location (e.g., to an appliance, server, or other switch) with state information including routing tables intact.

While the particular CENTRALIZED CONTROL PLANE APPLIANCE FOR VIRTUAL INFRASTRUCTURE is herein shown and described in detail, it is to be understood that the subject matter which is encompassed by the present invention is limited only by the claims.

What is claimed is:

1. A system comprising:
a memory;
a virtual machine monitor (VMM) centralized control plane (CCP) included in a virtual infrastructure established on plural physical computing apparatus, and spawned using a data center-operating system (DC-OS), the VMM CCP establishing, with a plurality of VMM data planes, including at least a first and second VMM data plane, a single virtual switch across all virtual machines {VMs} within one or more clusters of servers, wherein;
the first VMM data plane is associated with a first plurality of VMs and emulates a first linecard interfacing each of the first plurality of VMs to a network,
the second VMM data plane is associated with a second, different plurality of VMs and emulates a second linecard interfacing each of the second plurality of VMs to the network,
a first server in the one or more clusters hosts the first VMM data plane and the first plurality of VMs,
a second server in the one or more clusters hosts the second VMM data plane and the second plurality of VMs,
the VMM CCP communicates with the first and second VMM data planes and execute on an appliance remote from the first and second VMM data planes, the VMM CCP emulating a supervisor module of a modular switch chassis including the first and second linecards, and
the DC-OS managing communication with at least one redundant appliance that includes at least one standby VMM CCP instance.

2. The system of claim 1, wherein the VMM CCP is hosted by only one appliance and is the only control plane for a cluster of servers.

3. The system of claim 1, wherein at least two servers comprise a cluster, the VMM CCP being the only control plane for the cluster.

4. The system of claim 1, wherein the VMM CCP is hosted by only one VM and is the only control plane for a cluster of servers.

5. The system of claim 1, comprising a redundant CCP acting as a standby in each case of a CCP being integrated with the switch, whereby if the CCP is running on a switch detected to be failing, CCP functionality is moved to another processing location with state information intact.

6. The system of claim 1, wherein the DC-OS further manages communication with at least one external VM management application.

7. A method, comprising:
providing a cluster of computer servers;
instantiating, on at least a first server in the cluster, at least first and second virtual machines (VM);
instantiating, on at least the first server, a first virtual machine monitor (VMM) data plane communicating with the first and second VM, the first VMM data plane emulating a first linecard interfacing the first and second VM to a network;
instantiating, on at least a second server in the cluster, at least third and fourth virtual machines (VM);
instantiating, on at least the second server, a second virtual machine monitor (VMM) data plane communicating with the third and fourth VM, the second VMM data plane emulating a second line card interfacing the third and fourth VMs to a network;
establishing one and only one virtual machine monitor (VMM) centralized control plane (CCP) using an instance of a data center-operating system (DC-OS) wherein:
the VMM CCP communicates with the first and second VMM data planes and executes on an appliance remote from the first and second VMM data planes, the VMM CCP emulating a supervisor module of a modular switch chassis including the first and second linecards; and
the instance of the DC OS is executed by the appliance, manages communication with at least one redundant appliance that includes at least one standby VMM CCP instance.

8. The method of claim 7, comprising establishing the VMM CCP on a physical Ethernet switch.

9. The method of claim 7, comprising establishing the VMM CCP on a VM.

10. The method of claim 7, comprising:
   using a VMM data plane to transform packets in an incoming format to an outgoing format, and forwarding packets to output ports; and
   using the VMM CCP to execute at least a signalling protocol.

11. The method of claim 10, comprising using the VMM CCP for establishing routing tables.

12. The method of claim 10, comprising using the VMM CCP for establishing at least one quality of service policy.

13. The method of claim 10, comprising using the VMM CCP for exception handling.

14. The method of claim 10, comprising using the VMM CCP for monitoring data plane operation.

15. The method of claim 7, wherein the DC-OS further manages communication with at least one external VM management application.

16. An appliance, comprising:
   at least one processor; and
   at least one tangible non-transitory computer readable medium accessible to the processor and storing a single virtual machine monitor (VMM) centralized control plane (CCP) configured to communicate with plural VMM data planes in a cluster of servers and to execute remotely from the plural VMM data planes, wherein each of the plural VMM data planes is hosted on a respective one of the servers, communicates with respective plural virtual machines (VM) on the server, and emulates a respective linecard interfacing the corresponding plural VM to a network,
   wherein the VMM CCP emulates a supervisor module of a modular switch chassis including the first and second linecards, and the appliance executes an instance of a data center-operating system (DC-OS) managing communication with at least one redundant appliance that includes at least one standby VMM CCP instance.

17. The appliance of claim 16, wherein the control plane is useful for one of: establishing routing tables, establishing at least one quality of service policy, exception handling, monitoring data plane operation.

18. The appliance of claim 16, wherein the control plane is useful for at least two of: establishing routing tables, establishing at least one quality of service policy, exception handling, monitoring data plane operation.

19. The appliance of claim 16, wherein the DC-OS further manages communication with at least one external VM management application.

* * * * *